A. L. EACRETT.
HOSE CLAMP.
APPLICATION FILED APR. 1, 1913.
1,070,950. Patented Aug. 19, 1913.
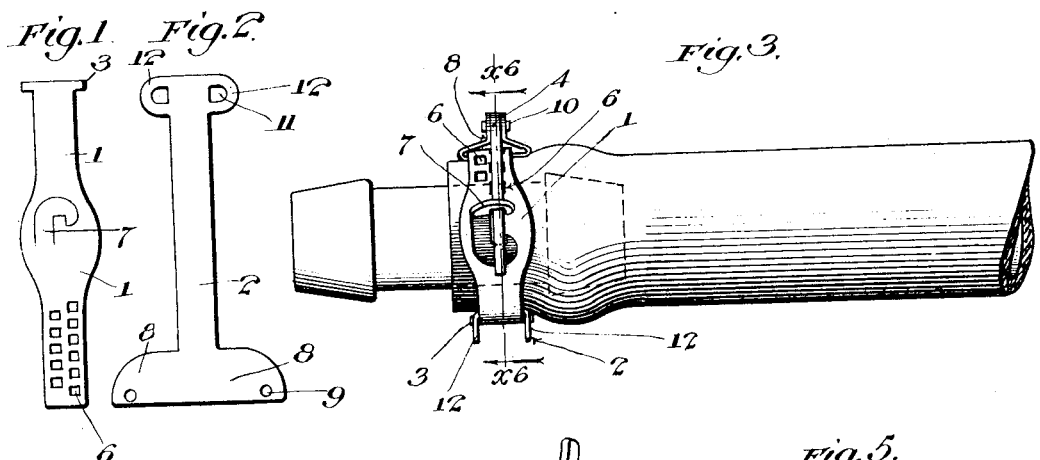
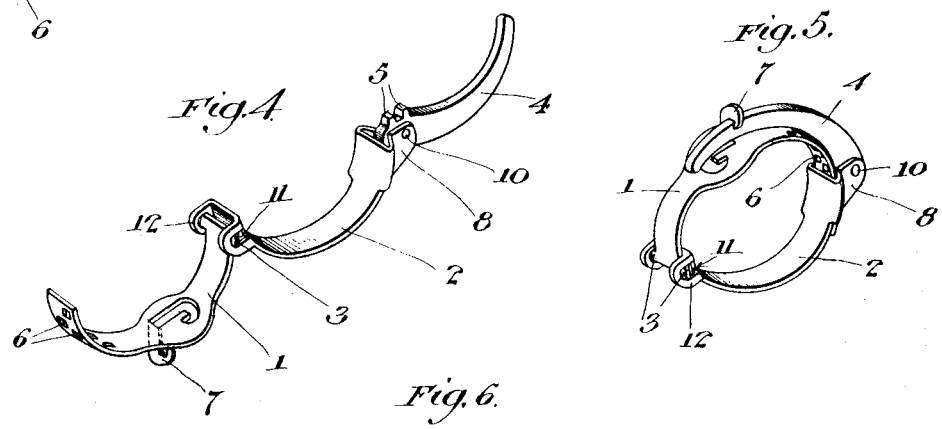
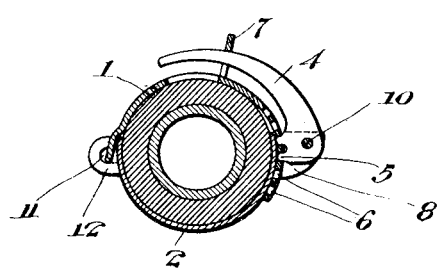
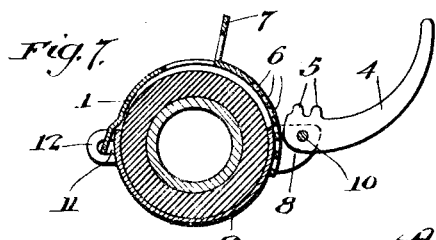
Witnesses:
Inventor:
Alfred L. Eacrett

UNITED STATES PATENT OFFICE.

ALFRED L. EACRETT, OF LOS ANGELES, CALIFORNIA, ASSIGNOR TO STEVENS, TURNER & COMPANY, OF LOS ANGELES, CALIFORNIA, A CORPORATION OF CALIFORNIA.

HOSE-CLAMP.

1,070,950.  Specification of Letters Patent.  Patented Aug. 19, 1913.

Application filed April 1, 1913. Serial No. 738,368.

*To all whom it may concern:*

Be it known that I, ALFRED L. EACRETT, a citizen of the United States, residing at Los Angeles, in the county of Los Angeles and State of California, have invented a new and useful Hose-Clamp, of which the following is a specification.

This invention relates to hose clamps, and the object of the invention is to provide a hose clamp which may be instantly attached or detached without the use of any tools.

A further object is to provide a hose clamp of this character which is of extremely economical manufacture, simple in construction, and effective and durable in use.

Referring to the drawings: Figure 1 is a plan view of the blank from which one of the members of the hose clamp is formed. Fig. 2 is a plan view of the blank from which the other member of the hose clamp is formed. Fig. 3 is a side elevation of a hose showing the clamp attached thereto. Fig. 4 is a perspective view of the clamp opened. Fig. 5 is a perspective of the clamp closed. Fig. 6 is a section on line $x^6$—$x^6$, Fig. 3. Fig. 7 is a view similar to Fig. 6 showing the clamp loosened.

The clamp comprises two members 1 and 2 which are hinged together at 3, each of the members being substantially semicircular and adapted to encircle the hose. Pivoted to the member 2 is a lever 4 having a pair of teeth 5 which are adapted to engage in slots 6 formed in the member 1. The slots 6 are formed in two sets, as clearly shown in Fig. 1 and staggered so as to give a close adjustment of the clamp.

To apply the clamp it is placed over the hose, the two members swung together as shown in Fig. 7, and then the lever 4 is swung around to engage its teeth 5 with two of the slots 6 and the lever is pressed down into the position shown in Figs. 5 and 6. If it is found that the two slots with which the teeth 5 are first engaged give either too loose or too tight a fit of the clamp, the lever 4 is swung back to disengage the teeth 5 and the teeth 5 are engaged with another set of slots in one direction or the other according to whether the clamp is too tight or too loose. The staggered arrangement of the teeth permits of a very close clamping adjustment and the desired clamping pressure is easily secured. In order to hold the lever 4 when the clamp is closed the lever is engaged underneath a hook 7.

I prefer to construct the device of sheet metal, as shown, the member 1 being formed from a blank as indicated in Fig. 1, this pivot being formed of two ears 3 and the hook 7 being struck out from the center portion of the member while the slots 6 are punched in the other end. The member 2 is formed with two wings 8 punched with holes 9, the wings being formed up to receive the lever 4 between them and the pin 10 passes through the holes 9 and pivots the lever 4 in position. The member 2 is widened where the wings 8 join and the base portions of the wings 8 are bent inwardly at 8' toward each other, and then the wings 8 extend outwardly parallel with each other, thereby forming a socket which is adapted to receive the slotted end of the member 1 and positively hold the member 1 from lateral displacement. This slot is somewhat wider than the slotted end of the member 1 to permit of the necessary lateral movement of member 1 necessary to permit the teeth 5 to be engaged with either set of slots 6. The slot also holds the member 1 from springing outwardly and thus coacts with the teeth 5 of lever 4 to firmly lock the member 1 in closed position. The lugs 3 of the member 1 are engaged in holes 11 which are punched in ears 12 formed on the end of the member 2 as shown in Fig. 2.

What I claim is:

1. A hose clamp, comprising two members formed of sheet metal, one of said members having a pair of lugs at one end and slots at the other end, the other member having at one end a pair of perforated ears and having at the other end a pair of perforated wings, said perforated wings being bent inwardly toward each other to form a socket, and then bent outwardly parallel with each other, a pivot extending through the perforated portion of said wings, a lever mounted between said wings on said pivot, said lever having teeth adapted to engage in said slots, the socket formed between said wings slidably receiving the end of the first member, and permitting a limited lateral movement thereof.

2. A hose clamp comprising two members formed of sheet metal, one of said members having a pair of lugs at one end and having a plurality of sets of slots at the other end, the other member having a pair of ears with perforations, the ears being bent at right angles to said member and receiving the lugs of the other member, the second member also having wings bent to form a pivot support, said wings being bent toward each other to form a socket and then bent outwardly parallel with each other, a pivot extending through said wings, a lever mounted on said pivot, said lever having teeth adapted to engage in said slots, said lever completely filling the space between said wings, and being thereby held firmly against lateral movement, the first member having a hook punched out therefrom to engage said lever, said first member being laterally movable in said socket to laterally engage either of its sets of slots with the teeth of said lever.

In testimony whereof, I have hereunto set my hand at Los Angeles, California, this 26th day of March, 1913.

ALFRED L. EACRETT.

In presence of—
Geo. T. Hackley,
Martha M. Lange.